UNITED STATES PATENT OFFICE 2,117,605

METHOD OF MAKING LIGHT-WEIGHT MOLDED MATERIAL

Albert A. Fowler, North Hollywood, and Russell M. Otis, Pasadena, Calif.

No Drawing. Application December 18, 1936, Serial No. 116,644

7 Claims. (Cl. 18—47.5)

This invention relates to a glass-like material of light weight and to the method of making the same.

In our patent, No. 2,038,034, we disclosed a material composed of a solidified silicate having a spumiform structure, that is, a bubbled or intumesced solidified material having a structure similar to that of foam. This spumiform material is well adapted to heat insulation and we have applied it to this use in several different forms—pulverulent or granular, and also as solid slabs. In the afore-mentioned patent, we specifically disclosed the use of alkaline silicates such as silicates of sodium and potassium. We have found, however, that materials made from these silicates alone are water-absorbent and are in time dissolved in presence of water, which properties, while not affecting their application to many classes of work, ill-adapt them for many other purposes.

An object of this invention, therefore, is to provide a light-weight, glass-like material which shall be comparatively insoluble in water.

Other objects are to provide light-weight glass-like materials in granular and slab form and having an intumesced or spumiform structure.

Other objects are to provide efficient methods of making the afore-mentioned glass-like materials.

Our finished composition comprises as constituents, alkaline oxide, boric oxide ($B_2O_3$), and silicon dioxide ($SiO_2$). The alkaline oxide may be, for example, sodium oxide ($Na_2O$), or potassium oxide ($K_2O$). The material of this composition is glass-like in character and, due to the manner of its preparation, may be made exceedingly light in weight, and almost entirely insoluble in water. The material of preferred composition, in granular form, may weigh from 0.9 to 1.5 lbs. per cu. ft. and is sufficiently strong at a density of 1.5 lbs. per cu. ft. to support a load of about 150 lbs. per sq. ft. of surface area without further deflection. In slab form our material may be made to weigh from about 4 lbs. per cu. ft. to greater than 12 lbs. per cu. ft. These materials have perhaps their greatest utility in the field of heat insulation and sound absorption, although they find application wherever their light weight, comparatively high strength, resistance to water solubility, and fireproof character are of advantage.

We preferably prepare our glass-like material in the following manner. Alkaline silicate, preferably, sodium silicate, of suitable composition, and in water solution, is brought to a temperature near the boiling point. To this is added boric acid ($H_3BO_3$), or sodium tetraborate ($Na_2B_4O_7, 10H_2O$), or other suitable substance which serves as a source of boric oxide. We may add the boric oxide or boric anhydride itself. Preferably we add boric acid, or sodium tetraborate, in a hot water solution, although they may be added in solid form if desired. When the boric oxide containing substance is added to the alkaline silicate solution, a white lump precipitate is formed therein which is broken up by agitation. The composition is heated at a temperature near boiling and while undergoing agitation until, with the preferred compositions, all of the white precipitate has dissolved to make a thick viscous liquid. In this stage, the liquid can be thinned somewhat by addition of a limited amount of water.

In the next stage of the process, the thick viscous liquid resulting from the above-described steps is poured out into shallow pans or onto a moving belt to be partially desiccated. In using pans, the material is poured to a depth of from ¼ to ½ inch and the pans are placed in an oven with a temperature of about 350° F. In using a belt, the material is poured in a relatively thin layer onto the belt and the belt is passed through a heated oven space. In any case, the drying is continued until a condition is reached at which, when the material is cooled to atmospheric temperature, it is a hydrous solid. This condition generally corresponds to a water content of from 15% to 25% of the material.

After this partially desiccated material has been cooled, it is comminuted to a size of particle which depends upon the finished material which it is desired to make. The material is very hard and brittle and cracks very easily. When granular material is to be the finished product, the hydrous or partially desiccated composition is preferably comminuted to from 40 mesh to 14 mesh in size, the larger particles making proportionately larger particles of the finished intumesced material. When molded bodies are to be made, the partially desiccated material of about 30 mesh is preferably employed.

In making granular spumiform material, we heat the comminuted, partially desiccated material rapidly by contacting it with a hot surface maintained at a temperature preferably of from 650° F. to 1000° F. This heating may be conducted in a heated drum in which an agitator is at work. The heating is done as rapidly as possible and preferably continues until dessication of the particles is substantially complete. In this heating operation, the particles presumably soften under the high temperature and the steam which is formed in them, due to the contained water, stretches and expands the particles until the water has all left, when solidification occurs and expansion ceases. In this operation each partially desiccated particle expands or explodes into one of from 30 to 40 times its original volume. The result is a granular material consisting of individual bubbled, intumesced, or spumiform particles each comprising one or more small hollow spherical shells of thin glass-like substance, the cells, in most cases communicating with one another because of the passages left by the rapid ejection of the contained water by heat. Our use of the word "granular" herein is meant to describe a material in which distinct granules are recognizable and is not meant to be restricted to any size of particle, as these may be from the size found in fine powder to that common in what might more properly be termed chunks. In applying the term spumiform to describe our material we do not intend that any limitation as to size of the material shall be implied. Some spumiform granules are so small that they consist of only a single bubble, while a molded spumiform body may consist of millions of cells or passages. This bubbled character, accompanied by relatively thin bubble walls, is the distinguishing feature of our material and is what we mean by the term spumiform. The thin walls, which are generally of much less thickness than the enclosed bubble spaces, permit deflection under pressure and thus cause a body of the granules to be compressible and resilient.

In making molded bodies of our glass-like composition we preferably place a multiplicity of partially desiccated particles of the intumescent composition in a molding form of the shape desired, close the form, and subject the form and contents to a temperature preferably of from 750° F. to 1000° F. for a time sufficient to effect substantially complete desiccation of the material. For a block 1 inch thick the heating may take place for from 20 to 30 minutes. It is desirable to permit the escape of water vapor from the molding form during heating without permitting any of the solidifying material to escape, and for this purpose a loose-fitting cover to the form is generally satisfactory. As the contents of the form are heated, the individual particles soften and are expanded by the pressure of steam formed within them. They expand against one another while in the softened condition and unite to form one spumiform body which becomes solid when the material has been completely desiccated. The tendency is always to expand to fill out all of the space in the form, so that molded bodies of all shapes may be made. The weight of a finished molded body may be controlled by putting more or less hydrous material into the form. It will be noted that since the steam from the inside of the body must get out through the outer portions, passages are formed from one bubble to the next so as to form intercommunicating cells. This type of structure is advantageous from the standpoint of sound absorption, while it is of no practical disadvantage for heat insulation due to the smallness of the communicating passages and the non-importance of this type of convection in affecting thermal conductivity in a body of this character.

We may put into the molding form the comminuted partially desiccated material above described just as it comes from the comminuting operation, but we prefer to place into the form hydrous or incompletely desiccated particles which have been intumesced somewhat by heat. Such particles are obtained by conducting the process exactly as if finished granular spumiform material were to be made but by conducting the expanding operation only part way to completion so that the particles are expanded to possibly only 10 or 20 times their volume and retain about 7 to 12% of water. This partially expanded granular intumescent material is then compressed into the molding form so as to completely fill it. There are several important advantages which result from this preferred procedure. First, the amount of water required to be removed from the contents of the molding form is reduced and the firing time is, therefore, lessened. Second, the increased volume of the particles due to the intumescing step makes it possible to completely fill the molding form with only a small weight of material, and results in light-weight molded bodies with sharp clean corners. When, instead, the unexpanded hydrous particles are employed and the form is filled, so much material is required due to its comparatively high density that the finished block is comparatively heavy. In order to make a light-weight slab, then, by using unexpanded hydrous particles in the molding form, one must resort to only partially filling the form, and after the slab is finished it is generally found that the material has not expanded to completely fill all corners as well as when the preferred method is followed. Third, the slab is of finer and more uniform structure because the individual particles do not have to expand to fill the form, for they already fill it and they need only exert pressure on one another and unite in place.

The composition above-mentioned as employed in making these materials has very superior properties compared to sodium silicate, for example. The most important advantage of the alkaline oxide-boric oxide-silica glass-like material is its relative insolubility in water. This is an exceedingly important property of a material to be employed as insulation. By the employment of the proper relative amounts of alkaline oxide, boric oxide, and silicon dioxide in the material it is possible to secure a solubility in boiling water which is only a small fraction of that of alkaline silicate, for instance. Another important property of our composition in the form of spumiform granules is that the granules are rounder and more uniform than is the case with granules made from alkaline silicate. The highest thermal insulation value per unit weight, other things being equal, will be found in a structure comprising a multitude of minute, hollow, round shells, with relatively thin walls, and the particles of our composition substantially match this description. Another important advantage of our composition is that we can secure over alkaline silicate, for instance, the great reduction in water solubility without any increase in the density of the finished spumiform material, and in fact in most of our preferred compositions the density of our finished material is less than the alkaline silicate which we may employ as the source of our alkaline oxide and silicon dioxide. This is a very important feature because the heat insulation value is least for low density material as is also the cost per cubic foot.

The chemical action between the several components of our glass-like composition is difficult to determine as is the case with all glass compositions; and we offer no theory as to the exact manner in which these components are combined, but content ourselves with defining the compositions, as is common in glass technology, by the relative proportions of oxides going to make up the total. And where we define our compositions in this manner, it is understood that we do so for convenience and that compositions having the specified components in the specified proportions shall be considered to be included within our definition regardless of the exact manner in which they may actually be combined.

Compositions of alkaline oxide, boric oxide, and silicon dioxide may advantageously be made having a mol. fraction of boric oxide greater than .03. A lesser proportion than this is without practical effect in our material. While we do not wish to be restricted to the proportions herein specified, we prefer to employ mol. fractions of boric oxide less than (2A—.35), where A is the mol. fraction of the alkaline oxide, for we find that it is not practical to form a desirably homogeneous composition with mol. fractions of boric oxide greater than these values. Moreover, in order to secure a satisfactory degree of water insolubility of the composition, we prefer to employ a mol. fraction of boric oxide less than .15 but greater than (2A—.46). Thus, we find the range of compositions combining the greatest advantages in a spumiform material to be those containing alkaline oxide, boric oxide, and silicon dioxide, these three being in proportions defined by the condition that the mol. fraction of boric oxide is greater than .03 and greater than (2A—.46) but less than .15 and less than (2A—.35) where A is the mol. fraction of the alkaline oxide. It will be noted that this definition restricts the proportions of all three components because since the sum of the mol. fractions of the three components equals 1.0 it is sufficient to define the relations between two of the components as done above and these relations automatically determine the proportions of the third component.

As examples of the method of forming compositions within this range, we offer the following. Proceeding in the manner previously described, we may add to 100 parts by weight of a sodium silicate solution having a 37% solid content comprising a sodium silicate with a mol. ratio of silicon dioxide to sodium oxide of 3.15, 13.5 parts by weight of commercial sodium tetraborate of 55% solid content, which is usual. The sodium tetraborate may be separated into $Na_2O \cdot 2B_2O_3$ for purposes of computation. The complete composition, then, will be found to consist of approximately .255 mol. fraction of $Na_2O$, .103 mol. fraction of $B_2O_3$ and .642 mol. fraction of $SiO_2$. Or we may add to 100 parts of the sodium silicate above mentioned of 3.15 ratio, 4.5 parts of boric acid ($H_3BO_3$). From the boric acid is derived boric oxide by the reaction $2H_3BO_3 = B_2O_3 + 3H_2O$. This composition then has the proportions: .227 mol. fraction of $Na_2O$, .056 mol. fraction of $B_2O_3$, and .717 mol. fraction of $SiO_2$. By employing alkaline silicates of other ratios and by proportioning the amount of sodium tetraborate or boric acid or a suitable quantity of each, it is possible to construct compositions containing any desired proportions of the three components.

The use of boric acid in making our intumescent compositions has important advantages over using sodium tetraborate. If one employs commercial sodium silicates as a convenient source of sodium oxide and silicon dioxide, it is possible by using boric acid or the boric anhydride to compound compositions which lie in a range of lower solubility than it is possible to make using the same sodium silicate and sodium tetraborate. This is because when sodium tetraborate is added as a source of boric oxide, one necessarily increases also the amount of sodium oxide in the composition by the amount of sodium oxide contained in the sodium tetraborate. Since there is no sodium oxide contained in boric acid or the anhydride, this situation is avoided by their use.

It is understood that our glass-like composition may be employed together with other materials such as fillers of one sort or another, etc., and we desire that our invention shall be considered to extend to all such applications wherever our composition shall be employed for its intumescent effect or shall be part of a spumiform structure. It is further understood that various equivalent substances and processes may be employed by those skilled in the art to arrive at the material of our invention without departing from the spirit of the invention defined in the appended claims.

We claim:

1. The method of making a light-weight molded body which comprises heating particles of a hydrous intumescent solid to create in them a spumiform structure, compressing said spumiform particles into a molding form and confining them therein, heating said form and contents at a temperature sufficiently high to unite said particles, and continuing said heating until desiccation is substantially complete.

2. The method of making a molded body which comprises heating particles of a hydrous intumescent composition containing alkaline oxide, boric oxide, and silicon dioxide, to create in them a spumiform structure, compressing said spumiform particles into a molding form and confining them therein, heating said form and contents at a temperature sufficiently high to unite said particles, and continuing said heating until desiccation is substantially complete.

3. The method of making a molded body which comprises forming a water solution containing alkaline oxide, boric oxide, and silicon dioxide, the mol. fraction of boric oxide in the composition being greater than .03 and greater than (2A—.46) and less than .15 and less than (2A—.35) where A is the mol. fraction of the alkaline oxide, partially desiccating said solution to form a hydrous solid, comminuting said solid, heating said comminuted material at a temperature sufficiently high to create in it a spumiform structure while still retaining some water, compressing the particles of said spumiform material into a molding form and confining them therein, heating said form and contents at a temperature sufficiently high to unite said particles, and continuing the heating until desiccation is substantially complete.

4. The method of making a light-weight molded body which comprises heating a hydrous intumescent material to create therein a spumiform structure, placing hydrous spumiform particles of said material into a molding form and confining them therein, heating said form and contents at a temperature sufficiently high to unite said particles, and continuing said heating until desiccation is substantially complete.

5. The method of making a light-weight molded body which comprises heating a hydrous intumescent composition containing alkaline oxide, boric oxide, and silicon dioxide, to create therein a spumiform structure, placing hydrous spumiform particles of said material into a molding form and confining them therein, heating said form and contents at a temperature sufficiently high to unite said particles, and continuing said heating until desiccation is substantially complete.

6. The method of making a light-weight molded body which comprises heating a hydrous intumescent material to create therein a spumiform structure, filling a molding form with hydrous spumiform particles of said material and confining them therein, heating said form and contents at a temperature sufficiently high to unite said particles, and continuing said heating until desiccation is substantially complete.

7. The method of making a light-weight molded body which comprises heating a hydrous intumescent compositon containing alkaline oxide, boric oxide, and silicon dioxide, to create therein a spumiform structure, filling a molding form with hydrous spumiform particles of said composition and confining them therein, heating said form and contents at a temperature sufficiently high to unite said particles, and continuing said heating until desiccation is substantially complete.

ALBERT A. FOWLER.
RUSSELL M. OTIS.